A. COMBS.
Velocipede.
No. 93,967. Patented Aug. 24, 1869.
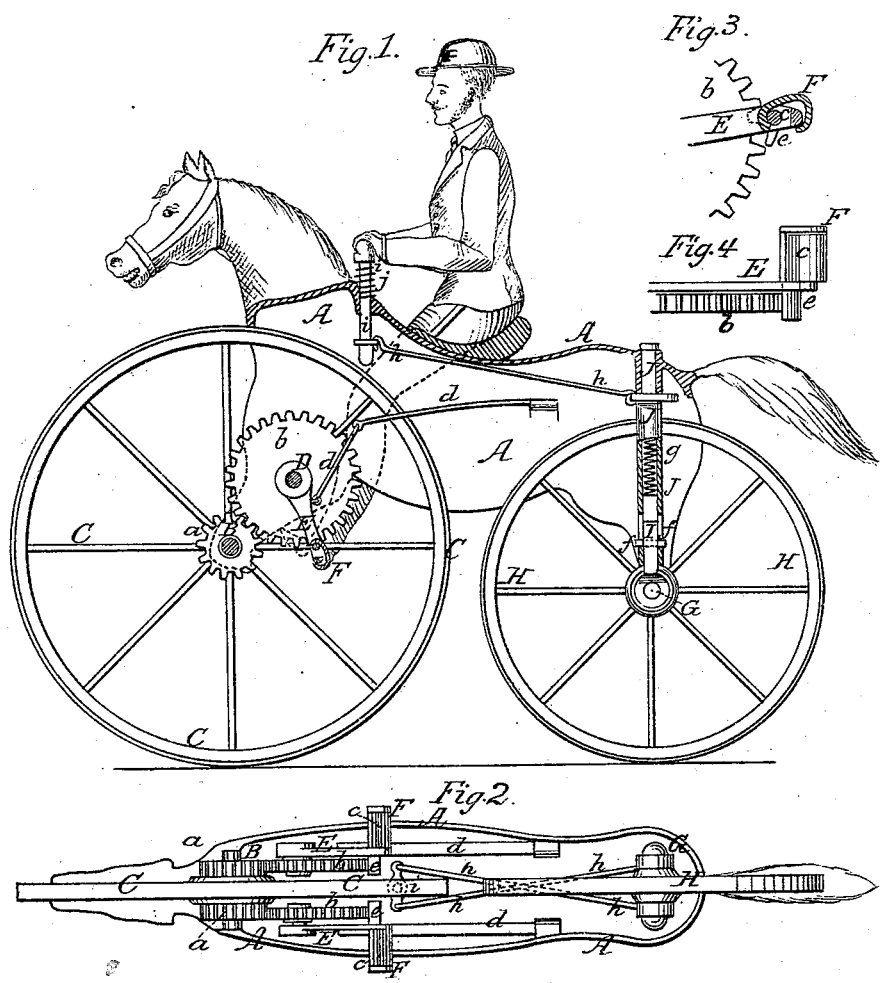
Witnesses.
O. Hinchman
Jno F. Brooks
Inventor;
A. Combs

United States Patent Office.

A. COMBS, OF HELENA, MONTANA TERRITORY.

Letters Patent No. 93,967, dated August 24, 1869.

IMPROVED VELOCIPEDE.

The Schedule referred to in these Letters Patent and making part of the same.

*To all whom it may concern:*

Be it known that I, A. COMBS, of Helena, in the county of Lewis and Clark, and Territory of Montana, have invented a new and improved Velocipede; and I do hereby declare that the following is a full, clear, and exact description thereof, which will enable others skilled in the art to make and use the same, reference being had to the accompanying drawing, forming part of this specification, in which—

Figure 1 represents a side elevation, partly in section, of my improved velocipede.

Figure 2 is an inverted plan view of the same.

Figure 3 is a detail sectional side view of the pawl-treadle.

Figure 4 is a detail edge or top view of the same.

Similar letters of reference indicate corresponding parts.

This invention relates to a new manner of propelling velocipedes, and of steering the same, and of arranging elastic support.

The object of the invention is to simplify the construction of the apparatus, to facilitate its operation, and to improve its appearance.

The body or frame A of the velocipede is made in the form of a horse, as shown, and has in the front legs the bearings of the front axle B, on which the wheel C is hung.

The axle B carries a pinion, $a$, on each side of the wheel, said pinions meshing into toothed wheels $b\ b$, that are hung on a shaft, D, above the axle, as shown.

On each end of the shaft D is pivoted loosely a crank, E, to which, at the outer end, a catch-treadle, F, is pivoted by a pin, $c$, as shown more fully in fig. 3.

A spring, $d$, has the tendency to draw the crank up.

When the treadle is not touched, its finger, $e$, will not reach into the teeth of the wheel $b$. Only when the foot is placed upon the rounded upper surface of the treadle, will the finger of the same be thrown into the toothed wheel.

When, now, the crank is forced down, the wheel $b$, and with it the axle B, will be turned. When pressure upon the treadle is released, the spring $d$ draws it up into position for the next stroke.

One treadle is moved down while the other swings up, so that continuous rotary motion of the axle B is thus produced.

The rear axle G, which carries the rear wheel or wheels H, has its bearings in a pin or arbor, I.

This pin is fitted into a tubular post, J, which is swivelled in the frame A.

The pin I has projecting pins $f$, that fit through slots of the tube, so that I cannot turn in J, although J can turn in the frame.

A spring, $g$, is interposed between the upper end of I and the end of the socket in J. It forms an elastic support for the back part of the frame.

A cross-head on the post J is, by means of crossed rods $h\ h$, connected with a cross-head on the steering-pin $i$.

This pin is fitted into the front part of the frame, and can be moved up or down at will, it being held up by a spring, $j$.

When forced down, its end will come upon the edge of the front wheel, to act as a brake.

Having thus described my invention,

What I claim as new, and desire to secure by Letters Patent, is—

1. The catch-treadle F, provided with a finger, $e$, and pivoted to the working-crank E, substantially as herein shown and described, to operate as set forth.

2. The crank E, carrying the catch-treadle F, when combined with the toothed wheel $b$ and spring $d$, all combined and operating substantially as herein shown and described.

3. The combination of the rear axle G with the pin I, slotted tubular post J, frame A, and spring $g$, all arranged and operating substantially as herein shown and described.

A. COMBS.

Witnesses:
   A. J. EDWARDS,
   W. H. WEBSTER.